United States Patent
Grunin et al.

(10) Patent No.: US 9,264,393 B2
(45) Date of Patent: Feb. 16, 2016

(54) MAIL SERVER-BASED DYNAMIC WORKFLOW MANAGEMENT

(71) Applicant: International Business Machines Corporation, Armonk, NY (US)

(72) Inventors: Galina Grunin, Briarcliff Manor, NY (US); David E. Nachman, Stamford, CT (US); Nader M. Nassar, Yorktown Heights, NY (US); Tamer M. Nassar, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 13/765,861

(22) Filed: Feb. 13, 2013

(65) Prior Publication Data

US 2014/0229554 A1 Aug. 14, 2014

(51) Int. Cl.
*G06F 15/16* (2006.01)
*H04L 12/58* (2006.01)
*G06Q 10/10* (2012.01)

(52) U.S. Cl.
CPC .............. *H04L 51/34* (2013.01); *G06Q 10/107* (2013.01); *H04L 12/5805* (2013.01); *H04L 12/5885* (2013.01); *H04L 51/14* (2013.01); *H04L 51/18* (2013.01)

(58) Field of Classification Search
CPC ...... G06Q 10/10; G06Q 10/107; H04L 12/58; H04L 12/585; H04L 12/5855
See application file for complete search history.

(56) References Cited

U.S. PATENT DOCUMENTS

| | | | |
|---|---|---|---|
| 5,765,033 A * | 6/1998 | Miloslavsky | G06Q 10/107 348/E7.082 |
| 6,370,567 B1 * | 4/2002 | Ouchi | 709/206 |
| 7,089,287 B2 | 8/2006 | Bellotti et al. | |
| 2003/0217176 A1 | 11/2003 | Beunings | |
| 2004/0215721 A1 * | 10/2004 | Szeto | H04L 12/58 709/204 |
| 2005/0039019 A1 * | 2/2005 | Delany | 713/176 |
| 2005/0198351 A1 | 9/2005 | Nog et al. | |
| 2008/0250479 A1 * | 10/2008 | Matoba | G06F 3/1204 726/5 |
| 2008/0288601 A1 | 11/2008 | Keohane et al. | |
| 2009/0049151 A1 | 2/2009 | Pagan | |
| 2010/0030858 A1 * | 2/2010 | Chasin | G06Q 10/107 709/206 |
| 2012/0198017 A1 * | 8/2012 | LeVasseur | H04L 51/24 709/206 |

OTHER PUBLICATIONS

"Email system metadata properties". IBM Content Collector, Version 2.1. Printed on: Oct. 27, 2012.
"Message transfer agent". Wikipedia, the free encyclopedia. Printed on: Oct. 31, 2012. <http://en.wikipedia.org/wiki/Message_transfer_agent>.

(Continued)

*Primary Examiner* — Mohamed Wasel
*Assistant Examiner* — Gregory P Tolchinsky
(74) *Attorney, Agent, or Firm* — Trentice V. Bolar; Matthew Chung

(57) ABSTRACT

Embodiments of the present invention provide a method, system, and program product for managing the flow of electronic mail. A computing device receives from a sender a first electronic mail addressed to first and second recipients in a serial propagation mode, and in response, the computing device transmits the first electronic mail en route to the first but not the second recipient. A computing device receives a second electronic mail from the first recipient as a response to the first electronic mail, and in response, a computing device transmits the first electronic email to the second recipient.

12 Claims, 5 Drawing Sheets

(56) References Cited

OTHER PUBLICATIONS

"MX record". Wikipedia, the free encyclopedia. Printed on: Oct. 27, 2012. <http://en.wikipedia.org/wiki/MX_record>.

"Simple Mail Transfer Protocol". Wikipedia, the free encyclopedia. Printed on: Oct. 27, 2012. <http://en.wikipedia.org/wiki/Simple_Mail_Transfer_Protocol>.

* cited by examiner

MAIL SERVER-BASED DYNAMIC WORKFLOW MANAGEMENT

FIELD OF THE INVENTION

The present invention relates generally to electronic mail processing, and more specifically to electronic mail servers which control the propagation of an email to addressees based on sender-determined criterion.

BACKGROUND

Electronic mail (abbreviated as "email" or "e-mail") is well known today. An email is sent from the originator or sender to one or more recipients identified by email address in the "to", "carbon copy" and "blind carbon copy" fields of the email. Current email engines attempt to send the email to all recipients concurrently without control by the sender.

In some email systems, the recipients have some control on the timing of receipt of emails addressed to them. The process of transferring email messages to and from a mail server to a recipient of each of the emails in a batch mode is called "replication". An email program at a client computer periodically (or at use request) replicates with its mail server at which time all emails generated at the client computer and selected for sending since the last replication are "pushed" to the mail server, and notifications of all emails waiting at the mail server for the client computer are added to and displayed in the list of unopened mail at the client computer. Another email program at another client computer for another recipient may then replicate the email message from the mail server.

In a web-based electronic mail program (webmail) a client may access the mail server and draft an email message in a user-interface operating on the client computer. Upon "sending" the email message, the mail server stores the email message in association with a recipient client. In web-based electronic mail programs, a copy is not typically stored on the client computer. A recipient client computer may access the server and allow a user to view a list of email messages in a user interface on the recipient client computer. The email message need not be stored on the recipient client computer. Some electronic mail programs are capable of both techniques at a user's discretion.

Emails can be used in a business work flow to communicate results of a work flow step. A workflow is a sequence of concatenated steps that depict a sequence of operations, declared as the work of a person, group, organization, or one or more simple or complex mechanisms. Existing workflow management solutions manage tasks such as automatic routing, partially automated processing and integration between different functional software applications and hardware systems that contribute to the value-addition process underlying the workflow.

Current workflow management systems include a client server application that moves a document of a work product to the next stage based on a predefined logic that is choreographed and stored in the back-end (server, database, middleware, etc.). Such systems require considerable effort and resources in installation, configuration, and maintenance.

SUMMARY

Embodiments of the present invention provide a method, system, and program product for managing the flow of electronic mail. A computing device receives from a sender a first electronic mail addressed to first and second recipients in a serial propagation mode, and in response, the computing device transmits the first electronic mail en route to the first but not the second recipient. A computing device receives a second electronic mail from the first recipient as a response to the first electronic mail, and in response, a computing device transmits the first electronic email to the second recipient. In certain embodiments, each of the computing devices is a mail server. In other embodiments, the computing device transmits the first electronic mail en route to a third recipient in response to the computing device receiving the second electronic mail from the first recipient failing to receive the second electronic mail within a predetermined time. In still other embodiments, the first electronic mail includes a propagation token included in at least one of the following electronic mail fields: To address; From address; Blind Carbon Copy address; Carbon Copy address; Subject; Date; Body; Header; of Attachments.

In additional embodiments, the second electronic mail address is a default electronic mail address for a response to the first electronic mail. In another embodiment, the method further comprises: a third electronic mail that is a response to the first electronic mail; and a computing device that transmits the second and/or the third electronic mail en route to the sender subsequent to receiving the second or third electronic mail.

DETAILED DESCRIPTION OF THE PRESENT INVENTION

The present invention will now be described in detail with reference to the figures.

Embodiments of the present invention will now be described in detail with reference to the accompanying drawings.

Figure 1:
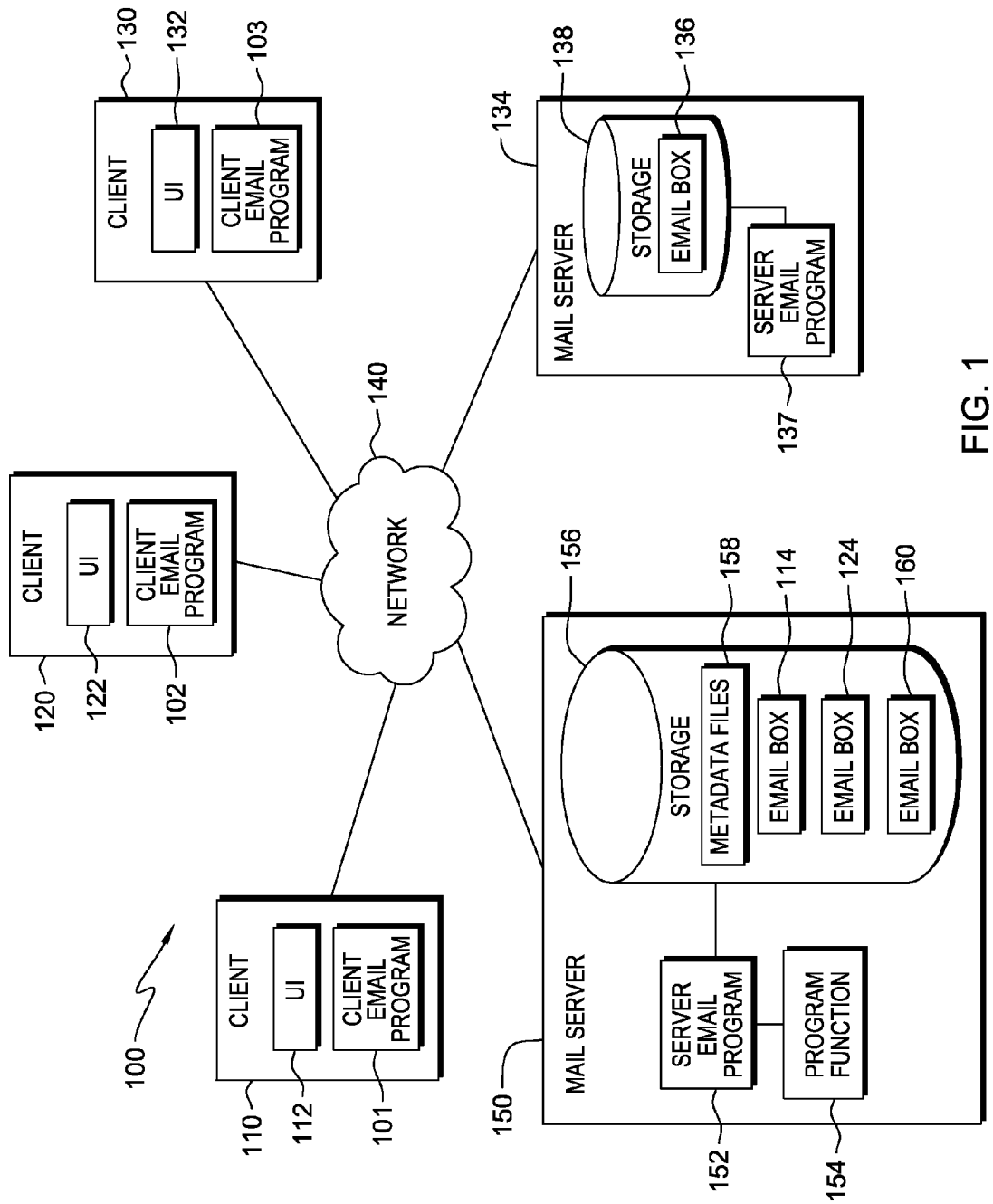
FIG. 1 is a functional block diagram of a dynamic email workflow system, in accordance with an embodiment of the present invention.

FIG. 1 is a functional block diagram of an email workflow system, generally designated 100, in accordance with an embodiment of the present invention. System 100 includes email clients 110, 120, and 130, and mail servers 134 and 150, all connected over network 140, in accordance with a preferred embodiment of the invention. Network 140 can be, for example, a local area network (LAN), a wide area network (WAN) such as the Internet, or a combination of the two, and include wired, wireless, or fiber optic connections. In general, network 140 can be any combination of connections and protocols that will support communications between clients 110, 120, and 130, and mail servers 134 and 150, in accordance with a desired embodiment of the invention.

In embodiments of the present invention, mail servers 134 and 150, and clients 110, 120, and 130 can each be, for example, a mainframe or minicomputer, a laptop, tablet, or netbook personal computer (PC), or a desktop computer. In general, mail servers 134 and 150, and clients 110, 120, and 130 can be any programmable electronic device capable of supporting the required functionality of an embodiment of the invention, and as described in further detail with respect to FIG. 4.

Email clients 110, 120, and 130 represent computing devices that can generate, send and receive emails, and display a list of opened and unopened emails. Some email clients immediately send to their respective email servers each email originated at the email client when the originator of an email selects to "send" the email. However, other e-mail clients batch incoming and outgoing emails such that when a person creates and selects to send an email, the email client does not send the email to its mail server the next periodic interval (along other emails created and attempted to be sent since the last interval. Likewise, emails sent from other mail servers are not forwarded to the mail server of the recipient/client system until the next periodic interval.

Email clients 110, 120, and 130 can communicate with each other and mail servers 134 and 150. In general, clients 110, 120, and 130 may be any computing device capable of generating, sending, and receiving email, accessing mail server 150 and viewing email included therein, in accordance with an embodiment of the present invention.

The email clients include respective client email programs 101, 102 and 103. Each of the client email programs 101, 102 and 103 generates a respective user interface 112, 122, and 132. User interfaces 112, 122, and 132 allow respective users to generate and send an email message, via clients 110, 120, and 130, respectively. Furthermore, user interfaces 112, 122, and 132 via clients 110, 120, and 130, respectively, allow a user to access a mail server and view a list of email stored therein, and download selected emails The mail servers 134, 150 and are interconnected via one or more networks 140. Mail server 134 represents a computing device capable of receiving an email message from and sending an email message to a computing device within network 140. Further, mail server 134 includes email program 137 and storage 138. Storage 138 is an information repository capable of receiving and storing email for a computing device included in system 100, for example, client 130. Storage 138 includes email box 136, which represents an electronic folder where email is delivered for a user of client 130.

Mail server 150 represents a computing device capable of receiving and replicating email to a computing device across a network, in accordance with a preferred embodiment of the present invention. Mail server 150 includes storage 156, email program 152, and email workflow program 154. Mail server 150 can receive email from another computing device, for example, mail server 134. Mail server 150 can send email to another computing device included in system 100, for example, mail server 150. Mail server 150 is associated with at least one domain name. A domain name is used to assign an address to a specific mail server such that email addressed utilizing the domain name is received by that specific mail server.

Figure 3:
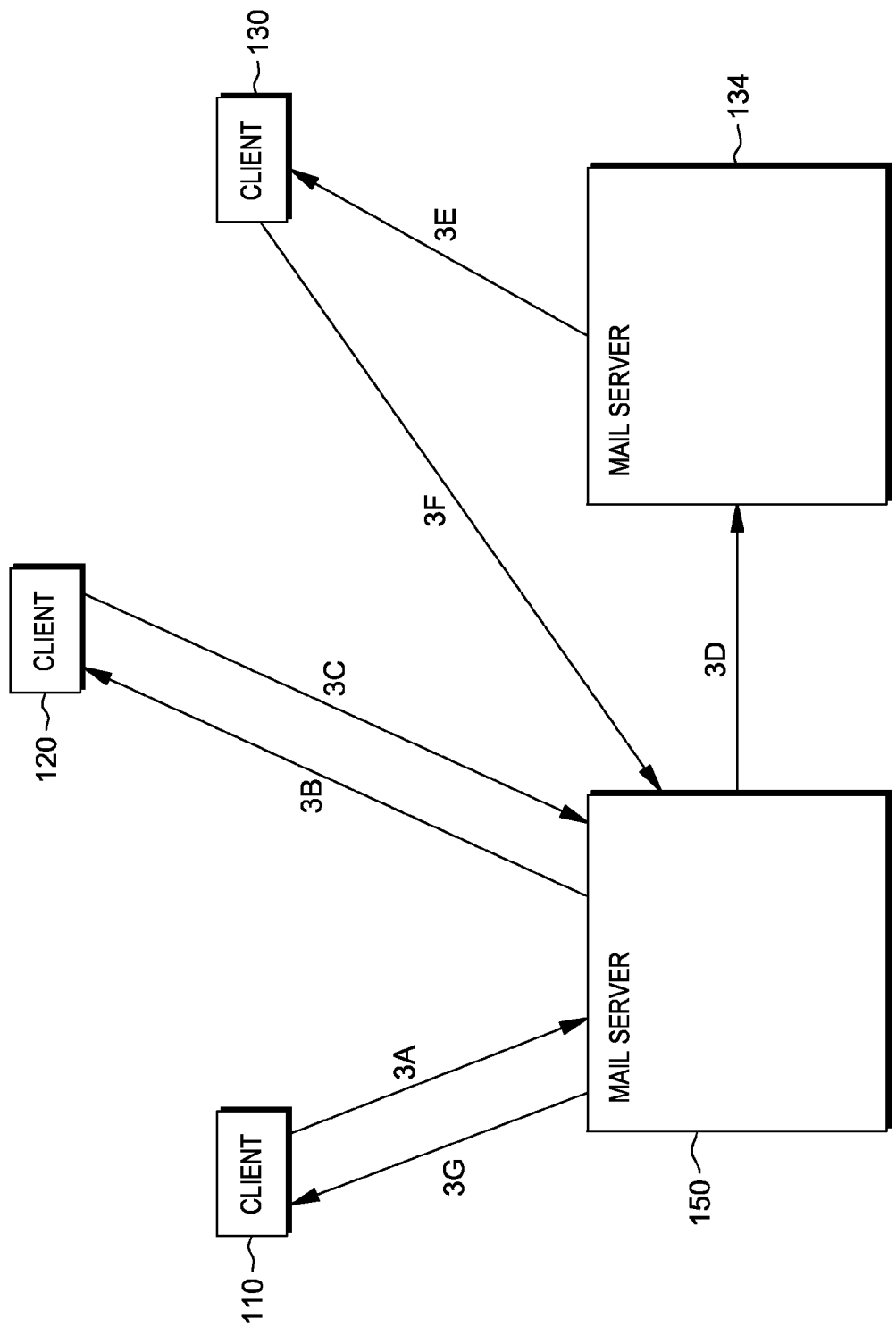
FIG. 3 is an exemplary embodiment of the present invention that depicts various communications among the client devices and mail servers of FIG. 1, in accordance with an embodiment of the present invention.

Storage 156, to be discussed further in relation to FIG. 3, is included in mail server 150 and associated with email program 152, in accordance with a preferred embodiment of the present invention. In other embodiments, storage 156 can be associated with network 140. Storage 156 represents an information repository wherein email and concomitant metadata, for example, metadata files 158, are stored. Storage 156 includes metadata files 158 and email boxes 114, 124, and 160, in accordance with a preferred embodiment of the present invention. Further, storage 156 is capable of storing emails and concomitant information in, for example, email boxes 114, 124, and 160; and metadata files 158, respectively. In general, storage 156 may be any information repository capable of storing email and concomitant information, in accordance with an embodiment of the present invention. Metadata files 158, included in storage 156, represents information about a particular email message included in storage 156.

Further, metadata files 158 includes information that at least reflects, for example, receipt date/time, senderID, recipientID, and response due date/time. In particular, metadata files 158 includes information related to emails included in email boxes 114, 124, and 160. In general, metadata files 158 can be any information about an email included in storage 156 which at least reflects, for example, receipt date/time, senderID, recipientID, and response due date/time, in accordance with an embodiment of the present invention.

Email boxes 114 and 124 are included in storage 156 and represent electronic folders where email associated with clients 110 and 120, respectively, is delivered and stored, in accordance with a preferred embodiment of the present invention. Although email box 160 is also included in storage 156, in contrast to email boxes 114 and 124, email box 160 represents an electronic folder where email addressed to mail server 150 is received and stored, in accordance with a preferred embodiment of the present invention.

Server email program 152 is included in mail server 150 and is associated with storage 156 and program function 154, in accordance with a preferred embodiment of the present invention. Further, sever email program 152 can replicate, via network 140, email to another computing device within system 100, for example, mail server 134. Further, email program 152 can generate an email message. Further still, email program 152 may receive instructions from program function 154.

Figure 2:
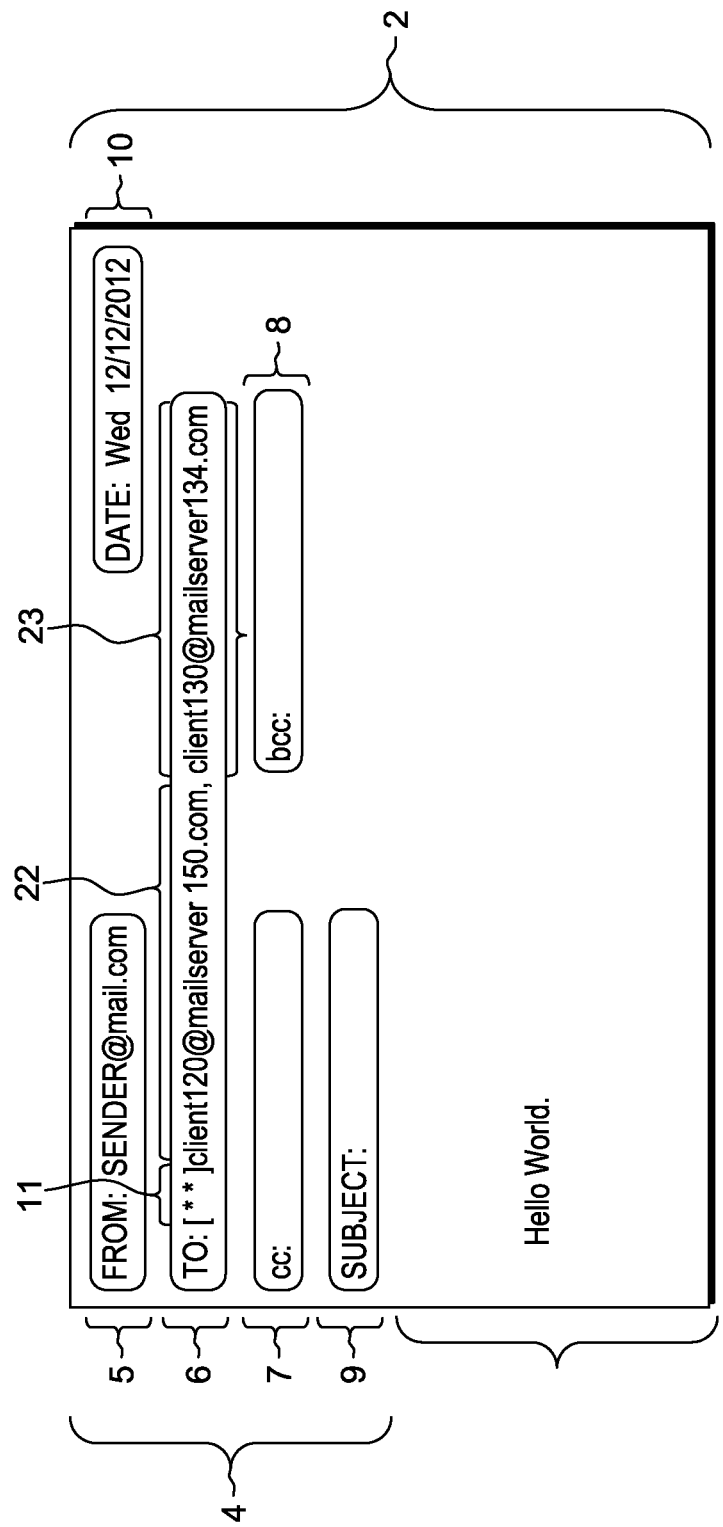
FIG. 2 is an exemplary embodiment of the present invention that depicts the structure of an email, in accordance with an embodiment of the present invention.

FIG. 2 is an exemplary embodiment of the present invention that depicts the structure of an email, in accordance with an embodiment of the present invention. As illustrated in FIG. 2, the structure of an email 2 comprises (a) a known Header field 4, which is structured into fields such as the From address 5, To address 6, Carbon Copy address(es) 7, Blind Carbon Copy address(es) 8, Subject 9, Date 10; and (b) a known Body field 11, which includes a desired message, typically expressed as textual phrases and sentences, and any attachments, typically expressed as files. According to the present invention, the email 2 also includes a "serial propagation mode" option token 11, which enables the creator of the email to specify a serial mode of propagating the email as explained below. In the serial propagation mode, the email servers forward emails to addressees in the "to" field in a controlled/serial manner according to the present invention. Each of the email client programs is served by a respective mail server.

The originator of the email composes the email using client email program 101 on a computer. Client email program 101 is similar to prior art client email programs such as Gmail and Lotus Notes, except that client email program 101 includes the new "serial propagation mode" option, according to the present invention. If the sender/originator of the email has selected the serial propagation mode option, the email will carry a serial propagation mode tag as metadata, and this will notify the mail server of the sender to automatically send the email to the first named addressee 22 in the "to-field", but not automatically send the email to any subsequent addressees in the "to-field" Likewise, the serial propagation mode tag will notify the mail server of the first addressee to send the email to the second addressee 23 in the "to-field" only after the first addressee replies to the sender. Thus, the email serially propagates from addressee to successive addressee listed in the "to" field, only after the prior addressee in the "to" field replies to the originator/sender. This creates a serial workflow. Dissemination within a serial workflow system can occur in one of two ways, according to the present invention. An email may be disseminated serially wherein a reply is returned to the originator/sender when generated by an addressee. Optionally, an email may be disseminated serially wherein the replies are returned to the originator/sender only after all addressees have replied. Here, a recipient may view prior replies before replying themselves. For example, a reply may include an acknowledgement that requested work has been done by the respective addressee and the actual results reflected in another file, such as computer program being specified at a high level by the first addressee, written by the second addressee, tested by the third addressee, etc. A reply may also include the actual work performed by the respective addressee.

As illustrated in FIGS. 1 and 2, when the originator of the email requests to send the email message, client email program 101 transfers the email from client 110 on which the email message was composed to an intermediate computer, such as the sender's mail server, mail server 150. In response, the sender's mail server, mail server 150 automatically transfers the email to the first addressee in the "to field". If the first addressee in the "to field" uses the same mail server, mail server 150, then mail server 150 sends a notification of the email to the first addressee. The notification typically comprises the name of the sender, the content of the subject field and the date and time of sending (in a list of opened and unopened emails of the first named addressee), but not the actual contents of the email. The first addressee can then request, via the first addressee's client email program, to download the email from the mail server, and the mail server will comply. If the first addressee in the "to field" uses a different mail server, for example, mail server 134, then mail server 150 of the sender sends the email to mail server 134 of the first addressee in the "to field". In response, mail server 150 of the first addressee sends a notification of the email to the first addressee. The notification typically comprises the name of the sender, the content of the subject field and the date and time of sending (in a list of opened and unopened emails of the first named addressee), but not the actual content of the email. The first addressee can then request, via the first addressee's client email program, to download the email from mail server 150, and mail server 150 will comply.

Subsequently, the first addressee accesses the downloaded email using client email program 101. The first addressee composes a reply email to the downloaded email using client email program 101. When the first addressee requests to send the reply, client email program 102 transfers the reply email to an intermediate computer, such as the first addressee's mail server, mail server 150. Mail server 150, depending on the nature of the token included in the original email mail server 150 may either transfer the first addressee's reply email to the originator/sender or delay transferring the reply email to the originator/sender until all replies have been received therein, at which point mail server 150 combines the reply emails and transfers them to the originator/sender. In response the first addressee's mail server, mail server 150, automatically transfers the email to the second addressee in the "to field". If the second addressee in the "to field" uses the same mail server, mail server 150, then mail server 150 sends a notification of the email to the second addressee. The notification typically comprises the name of the sender, the content of the subject field and the date and time of sending (in a list of opened and unopened emails of the first named addressee), but not the actual contents of the email. The second addressee can then request, via the second addressee's client email program, to download the email from the mail server, and the mail server will comply. If the second addressee in the "to field" uses a different mail server, for example, mail server 134, then mail server 150 of the first addressee sends the email to mail server 134 of the second addressee in the "to field".

In response, mail server 134 of the second addressee sends a notification of the email to the second addressee. The notification typically comprises the name of the sender, the content of the subject field and the date and time of sending (in a list of opened and unopened emails of the first named addressee), but not the actual content of the email. The second addressee can then request, via the second addressee's client email program, to download the email from mail server 134, and mail server 134 will comply. When the second addressee requests to send their reply, client email program 103 transfers the reply email from the computer on which the reply email message was composed, client 130, to an intermediate computer, mail server 150. Mail server 150, depending on the nature of the token included in the original email mail server 150 may either transfer the first addressee's reply email to the originator/sender or delay transferring the reply email to the originator/sender until all replies have been received therein, at which point mail server 150 combines the reply emails and transfers them to the originator/sender.

In accordance with a preferred embodiment of the present invention, server email program 152 includes a program function 154 which manages the serial propagation of an email in the serial propagation mode. Program function 154 determines the presence of a serial propagation token in the email received by email program 152, via mail server 150. A propagation token is a string of predefined characters that denote that the associated email is to be disseminated to a first recipient in a sequential manner wherein an email message is sent to the first listed recipient only, and then to the second listed recipient only after the first listed recipient responds to the email message, and so on. Propagation tokens may be placed in any standard email field, such as To, Cc, bcc, subject, and body. In addition to directing email message dissemination, a propagation token may also specify a delegate or escalating recipient that may be substituted for a recipient that fails to respond to an email before a predetermined deadline. Further, program function 154 can determine whether the "To:" field in an email message included in storage 156 lists a plurality of recipients.

Further still, program function 154 can instruct email program 152 to generate a modified email message that includes the Body of a replicated email message included in mail server 150 that included a propagation token. Although the modified email message is still addressed to a recipient of the replicated email message, unlike the replicated email message, the modified email message is addressed from mail server 150, for example, ms150@mailserver150.com. Designating mail server 150 as the sender of the modified email message ensures that all replies to the generated modified email message are not only received by mail server 150, but also that program function 154 is able to determine whether a particular recipient has responded to a particular modified email whether or not mail server 150 is the host mail server of that particular recipient. Furthermore, program function 154 can instruct email program 152 to deliver an email message to a recipient identified therein in a particular fashion.

Concepts introduced in the following discussion of FIG. 3 will be used further in the discussion of FIG. 4 in the context of system 100 of FIG. 1. Specifically, FIG. 3 illustrates an exemplary embodiment of the present invention wherein a particular batch email is generated by a client and disseminated sequentially to a plurality of recipients, wherein dissemination to an additional recipient is triggered in response to the current recipient responding to the disseminated email.

FIG. 3 is an exemplary embodiment of the present invention that depicts various communications among the client devices and mail servers of FIG. 1. Here, a batch email is generated wherein one recipient shares the same domain name as the sender, while the other recipient has unique domain name. In this particular example, each mail server hosts mailboxes for a particular domain name. For example, an email message addressed to XYZ@mailserver150.com is sent to a mailbox that is hosted by mail server 150. However, in other embodiments, a mail server hosts mailboxes for multiple domain names. For example, email messages addressed to XYZ@mailserver150.com and ABC@mailserverABC.com are sent to mailboxes that are hosted by mail server 150. Typically, where the recipient's domain name is the same as the sender's, a mail server need not route the message to an additional mail server. On the other hand, where the recipient's domain name is not the same as the sender's, the recipient's mail server usually routes the message to the sender's mail server, unless the recipient's mail server is associated with the recipient's and sender's domain names. The domain name that a mail server is associated with allows that mail server to host mailboxes that are associated with that particular mailbox.

To begin, client 110 generates a batch email (first email) that includes a propagation token in the To address field field, for example, <propagate>, and is addressed to the users of clients 120 and 130, for example, client120@mailserver150.com and client130@mailserver134.com, respectively. Here, the inclusion of the propagation token denotes that the first email is to be disseminated to the first listed recipient then to the second listed recipient only after the first recipient has responded thereto. In particular, communication 3A represents a communication between client 110 and mail server 150. Specifically, communication 3A represents the replication of the first email from client 110 to mail server 150 for subsequent processing.

Email program 152, via mail server 150, receives the first email in email box 114, which, as discussed above, is associated with the user of client 110. Program function 154 determines that the first email includes a predefined propagation token in the To address field of the first email. Subsequent to the determination, program function 154 instructs email program 152 to record the first email's recipientID, senderID, receipt due date/time, and receipt date/time in metadata files 158.

In other embodiments, the propagation token may be included in any field of an email message, for example, the Body, From address, To address, Carbon Copy address, Blind Carbon Copy address, Subject, and Date. In still other embodiments, the propagation token may denote another dissemination order for an email, for example, a broadcast dissemination order wherein an email message is to be delivered to all, but the final, email recipients at the same time, and then to the final recipient(s) only after all prior recipients have responded thereto. Subsequently, program function 154 instructs email program 152 to generate an email message that includes the Body of the first email, lists client120@mailserver150.com as the recipient, and lists ms150@mailserver150.com as the sender (second email). Program function 154 instructs email program 152 to associate the second email with the first email in metadata files 158, thereby associating the first email to any reply to the second email.

Subsequent to the generation of the second email, program function 154 instructs email program 152 to disseminate the second email appropriately. Here, email program 152 needs only to transfer a copy of the second email to email box 124, which receives email sent to client120@mailserver150.com, since the sender and recipient email addresses include the same domain name, i.e., "mailserver150.com". As will be discussed in further detail below, email program 152 takes a different dissemination course when the sender and recipient have differing domain names. Subsequent to the transfer, client 120 determines that email box 124 includes the second email, which thereby sets the stage for communication 3B. In particular, communication 3B represents a replication of the second email from mail server 150 to client 120. Subsequent to the replication, client 120 determines that the second email requires a response within a predetermined time, for example, seventy-two hours. For example, a response may include viewing and adding content to an email message.

The required response forms the basis of communication 3C, wherein client 120, via email program 152, generates a third email that includes the response to the second email. Subsequent to the generation, client 120, via email program 152, replicates the third email to email box 160, ms150@mailserver150.com. Email program 152 receives the third email. Program function 154 instructs email program 152 to record the receipt date/time associated with the third email in metadata files 158. Program function 154 accesses metadata files 158, compares the due date/time of the first email with that of the third email and determines that the third email's receipt is not tardy. Subsequently, program function 154 determines that the first email includes an additional recipient included in the "To:" address field and instructs email program to generate an email message that includes the Body of the first email, lists client130@mailserver134.com as the recipient, lists ms150@mailserver150.com as the sender, and has a due date of seventy-two hours (fourth email).

Program function 154 instructs email program 152 to associate the fourth email with the first email in metadata files 158 and records the recipientID, senderID, receipt due date/time, and receipt date/time. Further, program function 154 instructs email program 152 to disseminate the fourth email to the listed recipient (communication 3D) of the fourth email, client130@mailserver134.com. Email program 152, in response to the instruction, disseminates the fourth email to client130@mailserver134.com. For example, email program 152 determines that mail server 134 is the host mail server for the recipient's domain name, mail server 134.com, and, via network 140, replicates the fourth email to email box 136, which is the email box that receives email messages addressed to client130@mailserver134.com.

Subsequent to the replication, client 130 determines that email box 136 includes the fourth email. In response to the determination, client 130, via network 140, replicates the fourth email from mail server 134 to client 130 (communication 3E). Subsequently, program function 154 determines that the fourth email requires a response within seventy-two hours of receipt. Subsequent to the replication, client 130, generates a fifth email that includes a response to the fourth email. Further, client 130 replicates the fifth email to email box 160, via mail server 150, which, as discussed above, is the email box of the recipient of the fourth email, ms150@mailserver150.com (communication 3F). Subsequently, program function 154 determines that the first email lists no additional recipients.

For example, program function 154 accesses information associated with the first email included in metadata files 158, which includes information associated with the third and fifth emails, compares the recipients of the third and fifth emails to the recipients listed in the first email, and determines that a reply email has been received from all recipients listed in the first email. Subsequent to the determination, program function 154 instructs email program 152 to generate and disseminate an email message (sixth email) addressed to the sender of the first email, client110@mailserver150.com, which includes the third and fifth email, the reply to the second and fourth emails, respectively. For example, since mail server 150 is the host mail server for client110@mailserver150.com, mail server 150 transfers the sixth email to the email box associated with client 110, email box 114 (communication 3G).

Figure 4:
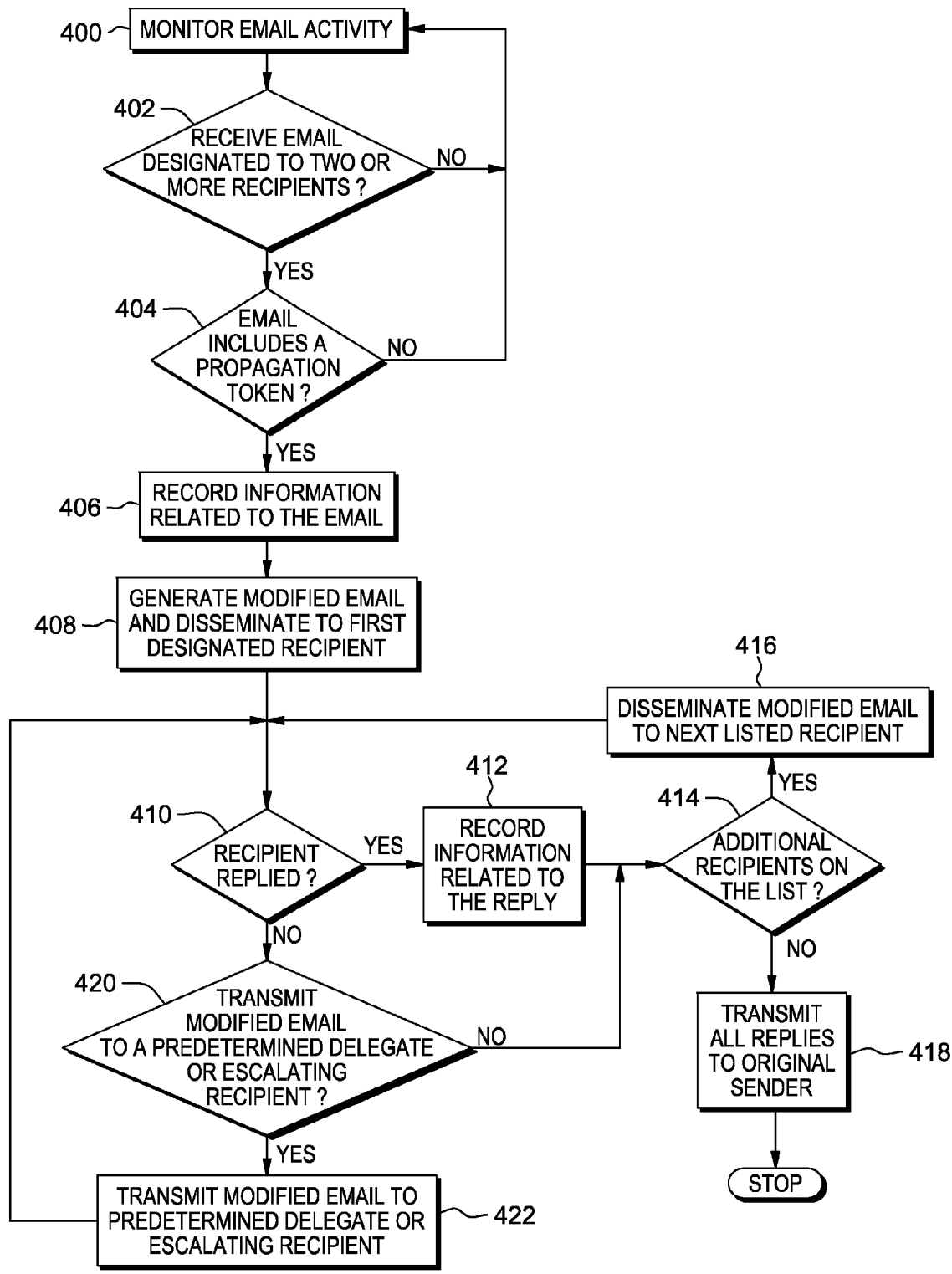
FIG. 4 is a flowchart depicting the steps of the dynamic email workflow program of FIG. 1, in accordance with an embodiment of the present invention.

FIG. 4 is a flowchart depicting the steps of program function 154 for managing flow of electronic mail, in accordance with an embodiment of the present invention. Program function 154 monitors email activity of mail server 150 (step 400). If program function 154 determines that mail server 150 received an email message that is not designated to two or more recipients ("no" branch, decisional 402), then program function 154 returns to step 400. However, if program function 154 determines that mail server 150 received an email that is designated to two or more recipients ("yes" branch, decisional 402), then program function 154 determines whether the received email includes a propagation token (decisional 404). If program function 154 determines that the received email does not include a propagation token ("no" branch, decisional 404), then program function 154 returns to step 400.

On the other hand, if program function 154 determines that the received email includes a propagation token ("yes" branch, decisional 404), then program function 154 instructs email program 152 to record information related to the received email (step 406). Subsequently, program function 154 instructs email program 152 to generate a modified email with mail server 150 as the sender and disseminate the modified email to the first recipient listed in the received email (step 408). If program function 154 determines that the recipient replied to the modified email ("yes" branch, decisional 410), then program function 154 instructs email program 152 to record information related to the reply (step 412). Subsequently, if program function 154 determines that there are no additional recipients included on the list of the received email ("no" branch, decisional 414), then program function 154 instructs email program 152 to transmit all replies received by mail server 150 to the original sender of the batch email (step 418) and stop.

On the other hand, if program function 154 determines that the recipient has not replied to the modified email ("no" branch, decisional 410), then program function 154 determines whether to send the modified email to a predetermined delegate or escalating recipient (decisional 420). If program function 154 determines that there is no need to send the modified email to a predetermined delegate or escalating recipient ("no" branch, decisional 420), then DEWP proceeds to decisional 314. On the other hand, if program function 154 determines that there is a need to send the modified email to a predetermined delegate or escalating recipient ("yes" branch, decisional 420), then program function 154 instructs email program 152 to transmit the modified email to a predetermined delegate or escalating recipient (step 422) and proceeds to step 410.

The foregoing description of various embodiments of the present invention has been presented for purposes of illustration and description. It is neither intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 5:
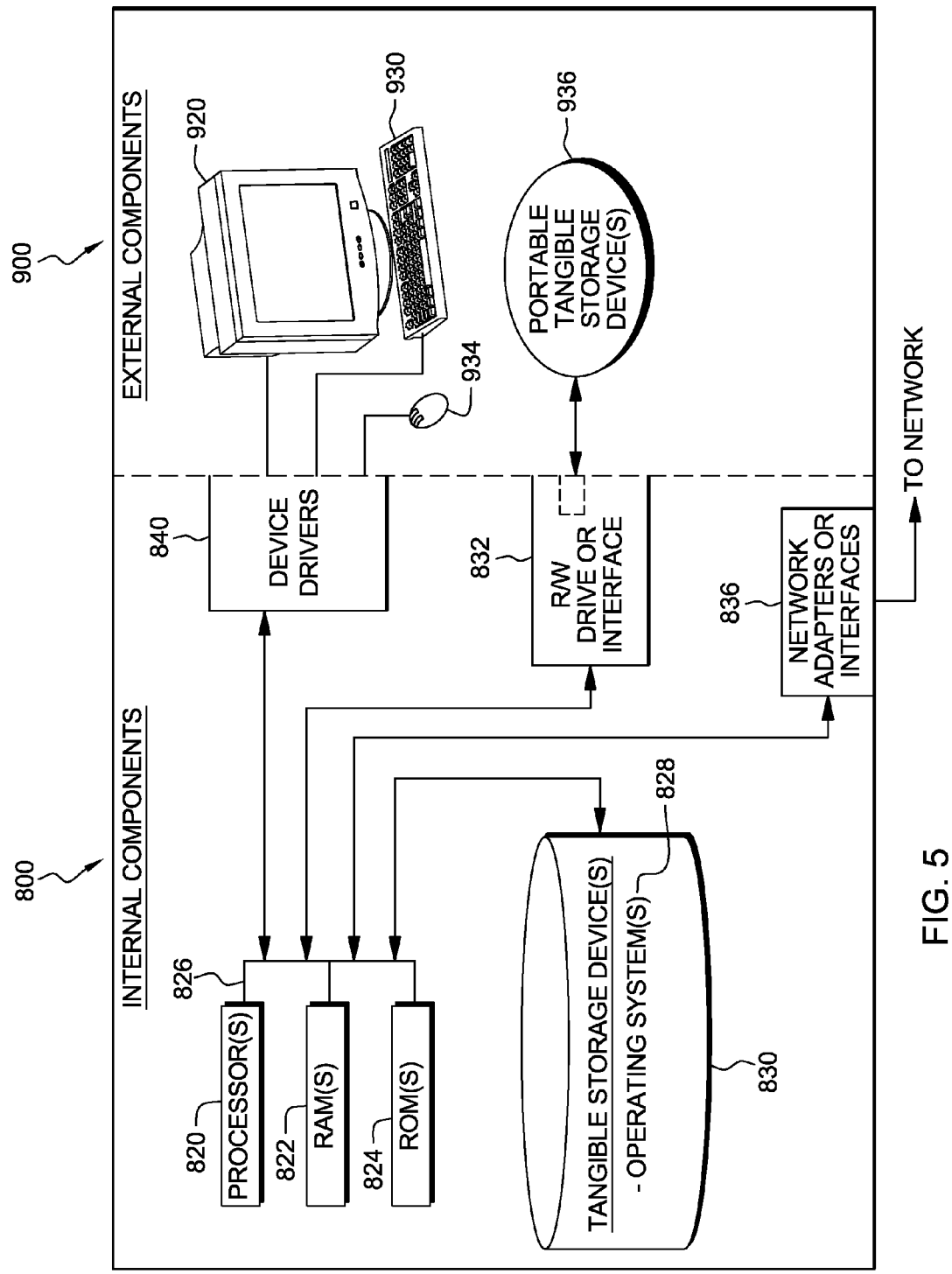
FIG. 5 is block diagram of the components of a data processing system 800, 900, such as clients 110, 120 and 130 or mail servers 150 and 134 of FIG. 1.

FIG. 5 shows a block diagram of the components of a data processing system 800, 900, such as clients 110, 120 and 130, or mail servers 150 and 134 of FIG. 1, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Clients 110, 120, and 130, or mail servers 150 and 134 include respective sets of internal components 800a, b, c, d, e and external components 900a, b, c, d, e illustrated in FIG. 4. Each of the sets of internal components 800a, b, c, d, e includes one or more processors 820, one or more computer-readable RAMs 822 and one or more computer-readable ROMs 824 on one or more buses 826, and one or more operating systems 828 and one or more computer-readable storage devices 830. The one or more operating systems 828 and user interfaces 112, 122, and 132 in clients 110, 120, and 130, respectively; server email program 152 and program function 154 in mail server 150; client email programs 101, 102, and 103 in clients 110, 120, and 130, respectively; and email program 137 in mail server 134 are stored on one or more of the respective computer-readable storage devices 830 for execution by one or more of the respective processors 820 via one or more of the respective RAMs 822 (which typically include cache memory). In the embodiment illustrated in FIG. 5, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but not propagate a computer program and digital information.

Each set of internal components 800a, b, c, d, e also includes a R/W drive or interface 832 to read from and write to one or more portable computer-readable storage devices 936 such as a CD-ROM, DVD, memory stick, magnetic tape, magnetic disk, optical disk or semiconductor storage device that can store but not propagate programs and data. Server email programs 152 and 137 in mail servers 150 and 134, respectively; client email programs 101, 102, and 103 in clients 110, 120, and 130, respectively; and program function 154 in mail server 150 can be stored on one or more of the respective portable computer-readable storage devices 936, read via the respective R/W drive or interface 832 and loaded into the respective hard drive 830.

Each set of internal components 800*a, b, c, d, e* also includes network adapters or interfaces 836 such as a TCP/IP adapter cards, wireless wi-fi interface cards, or 3G or 4G wireless interface cards or other wired or wireless communication links. Server email programs 152 and 137 in mail servers 150 and 134, respectively, and client email programs 101, 102, and 103 in clients 110, 120, and 130, respectively, can be downloaded to respective mail servers 150 and 134 from an external computer via a network (for example, the Internet, a local area network or other, wide area network) and respective network adapters or interfaces 836. From the network adapters or interfaces 836, the Email programs 152 and 137 in mail servers 150 and 134, respectively are loaded into the respective hard drive 830. The network may comprise copper wires, optical fibers, wireless transmission, routers, firewalls, switches, gateway computers and/or edge servers.

Each of the sets of external components 900*a, b, c, d, e* can include a computer display monitor 920, a keyboard 930, and a computer mouse 934. External components 900*a, b, c, d, e* can also include touch screens, virtual keyboards, touch pads, pointing devices, and other human interface devices. Each of the sets of internal components 800*a, b, c, d, e* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for managing flow of a serial propagation mode electronic mail, according to a serial propagation ordering, to a plurality of recipients including at least a set of first-hop recipient(s), at least a first recipient and a set of second-hop recipient(s), the method comprising:
    the first recipient receiving at a first recipient server, from a sender mail server, a first version of an electronic mail, with the electronic mail including a serial propagation token;
    the first recipient server automatically determining the set of second-hop email recipient(s) based upon the serial propagation token of the electronic mail; and
    the first recipient server sending a second version of the electronic mail to the set of second-hop recipient(s), wherein the second version of the electronic mail may be identical to the first version or modified;
    wherein the propagation token defines the full propagation sequence ordering for the electronic mail so that all recipient servers send appropriate versions of the electronic mail to recipient(s) as automatically determined based on the serial propagation token.

2. The method of claim 1 wherein the first version of the electronic mail and second version of the electronic mail have different: content or attachment(s).

3. The method of claim 1, wherein the serial propagation token included in at least one of the following electronic mail fields:
    To address;
    From address;
    Blind Carbon Copy address;
    Carbon Copy address;
    Subject;
    Date;
    Body;
    Header; or
    Attachments.

4. The method of claim 1, wherein:
    the serial propagation ordering defined by the serial propagation token has a plurality of hops including a first hop and a second hop; and
    at each hop the electronic mail is sent to only one recipient.

5. A computer program product, stored on a non-transitory computer readable storage medium, for managing flow of a serial propagation mode electronic mail, according to a serial propagation ordering, to a plurality of recipients including at least a set of first-hop recipient(s), at least a first recipient and a set of second-hop recipient(s), comprising thereon:
    first instructions, executable by a first recipient server associated with the first recipient, to cause the first recipient server to receive, from a sender, a first version of an electronic mail, with the electronic mail including a serial propagation token;
    second instructions, executable by the first recipient server to cause the first recipient server to automatically determine the set of second-hop recipient(s) based upon the serial propagation token of the electronic mail; and
    third instructions, executable by the first recipient server, to cause the first recipient server to send a second version of the electronic mail to the set of second-hop recipient(s), wherein the second version of the electronic mail may be identical to the first version or modified;
    wherein the propagation token defines the full propagation sequence ordering for the electronic mail so that all recipient servers send appropriate versions of the electronic mail to recipient email servers as automatically determined based on the serial propagation token.

6. The computer program product of claim 5 wherein the first version of the electronic mail and second version of the electronic mail have different: content or attachment(s).

7. The computer program product of claim 5, wherein the serial propagation token included in at least one of the following electronic mail fields:
   To address;
   From address;
   Blind Carbon Copy address;
   Carbon Copy address;
   Subject;
   Date;
   Body;
   Header; or
   Attachments.

8. The computer program product of claim 5, wherein:
   the serial propagation ordering defined by the serial propagation token has a plurality of hops including a first hop and a second hop; and
   at each hop the electronic mail is sent to only one recipient.

9. A first email server for managing flow of a serial propagation mode electronic mail, according to a serial propagation ordering, to a plurality of recipients including at least a set of first-hop recipient(s), at least a first recipient associated with a first recipient server and a set of second-hop recipient(s), the first email server comprising:
   a processor(s) set; and
   a computer readable storage medium;
   wherein:
   the processor set is structured, located, connected and/or programmed to execute instructions stored on the computer readable storage medium; and the instructions include:
   first instructions executable to cause the first recipient server to receive, from a sender, a first version of an electronic mail, with the electronic mail including a serial propagation token,
   second instructions executable to cause the first recipient server to automatically determine the set of second-hop recipient(s) based upon the serial propagation token of the electronic mail, and
   third instructions executable to cause the first recipient server to send a second version of the electronic mail to the set of second-hop recipient(s), wherein the second version of the electronic mail may be identical to the first version or modified;
   the propagation token defines the full propagation sequence ordering for the electronic mail so that all recipient servers send appropriate versions of the email to recipient(s) as automatically determined based on the serial propagation token.

10. The first email server of claim 9 wherein the first version of the electronic mail and second version of the electronic mail have different: content or attachment(s).

11. The first email server of claim 9, wherein the serial propagation token included in at least one of the following electronic mail fields:
   To address;
   From address;
   Blind Carbon Copy address;
   Carbon Copy address;
   Subject;
   Date;
   Body;
   Header; or
   Attachments.

12. The first email server of claim 9, wherein:
the serial propagation ordering defined by the serial propagation token has a plurality of hops including a first hop and a second hop; and
at each hop the electronic mail is sent to only one recipient.

* * * * *